(12) United States Patent
Park et al.

(10) Patent No.: US 10,525,348 B2
(45) Date of Patent: Jan. 7, 2020

(54) SYSTEM FOR GENERATING GAME REPLAY VIDEO

(71) Applicant: MINKONET CORPORATION, Seoul (KR)

(72) Inventors: Kyung Soo Park, Gyeonggi-do (KR); Tae Woo Kim, Gyeonggi-do (KR); Dong Hwal Lee, Seoul (KR)

(73) Assignee: MINKONET CORPORATION, Seoul (KR)

( * ) Notice: Subject to any disclaimer, the term of this patent is extended or adjusted under 35 U.S.C. 154(b) by 0 days.

(21) Appl. No.: 16/020,963

(22) Filed: Jun. 27, 2018

(65) Prior Publication Data

US 2019/0001221 A1 Jan. 3, 2019

(30) Foreign Application Priority Data

Jun. 28, 2017 (KR) ........................ 10-2017-0081911

(51) Int. Cl.
*A63F 13/00* (2014.01)
*A63F 13/497* (2014.01)
*A63F 13/525* (2014.01)

(52) U.S. Cl.
CPC .......... *A63F 13/497* (2014.09); *A63F 13/525* (2014.09); *A63F 2300/577* (2013.01); *A63F 2300/634* (2013.01); *A63F 2300/8082* (2013.01)

(58) Field of Classification Search
None
See application file for complete search history.

(56) References Cited

U.S. PATENT DOCUMENTS

| 5,588,104 | A | * | 12/1996 | Lanier | G06F 8/34 715/848 |
| 5,748,199 | A | * | 5/1998 | Palm | H04N 13/133 345/473 |
| 6,040,841 | A | * | 3/2000 | Cohen | G06T 15/00 345/473 |
| 6,400,364 | B1 | * | 6/2002 | Akisada | G06T 15/20 345/420 |
| 7,241,219 | B2 | * | 7/2007 | Walker | A63F 3/081 463/16 |
| 7,751,628 | B1 | * | 7/2010 | Reisman | G11B 27/034 382/232 |
| 7,867,086 | B2 | * | 1/2011 | Sitrick | H04N 5/272 463/31 |
| 2003/0118330 | A1 | * | 6/2003 | Ito | H04N 9/8042 386/232 |

(Continued)

FOREIGN PATENT DOCUMENTS

| JP | 2017055935 | 3/2017 |
| KR | 20160137924 | 12/2016 |
| KR | 101739220 | 5/2017 |

*Primary Examiner* — Paul A D'Agostino
(74) *Attorney, Agent, or Firm* — JCIPRNET

(57) ABSTRACT

Provided are a system for generating a game replay video, and more particularly, a system for generating a game replay video as a virtual reality (VR) video by recording a game play situation to be viewed on a replay terminal. According to the system for generating a game replay video, a VR video in a form of inducing a user to easily view important scenes of a game video may be provided to the user, thereby increasing the users' motive for and interest in viewing the VR video.

10 Claims, 1 Drawing Sheet

(56) References Cited

U.S. PATENT DOCUMENTS

| | | | |
|---|---|---|---|
| 2005/0134945 A1* | 6/2005 | Gallagher | G06F 16/532 358/527 |
| 2006/0038890 A1* | 2/2006 | MacIntosh | A63F 13/02 348/211.99 |
| 2007/0088709 A1* | 4/2007 | Bailey | G06F 3/04815 |
| 2008/0132338 A1* | 6/2008 | Yoshida | A63F 13/06 463/43 |
| 2008/0312010 A1* | 12/2008 | Marty | A63B 24/0003 473/447 |
| 2009/0238378 A1* | 9/2009 | Kikinis | H04N 13/398 381/92 |
| 2012/0244939 A1* | 9/2012 | Braun | G06K 9/228 463/31 |
| 2013/0065692 A1* | 3/2013 | Aronzon | A63F 13/12 463/42 |
| 2013/0178257 A1* | 7/2013 | Langseth | G06T 17/05 463/4 |
| 2013/0278631 A1* | 10/2013 | Border | G02B 27/017 345/633 |
| 2014/0362111 A1* | 12/2014 | Kim | G06T 19/006 345/633 |
| 2015/0029304 A1* | 1/2015 | Park | H04N 5/23238 348/36 |
| 2015/0032766 A1* | 1/2015 | Greenbaum | G06F 16/444 707/756 |
| 2015/0254882 A1* | 9/2015 | Englert | G02B 27/017 345/633 |
| 2015/0260474 A1* | 9/2015 | Rublowsky | F41A 33/00 434/16 |
| 2015/0348580 A1* | 12/2015 | van Hoff | G11B 19/20 348/38 |

\* cited by examiner

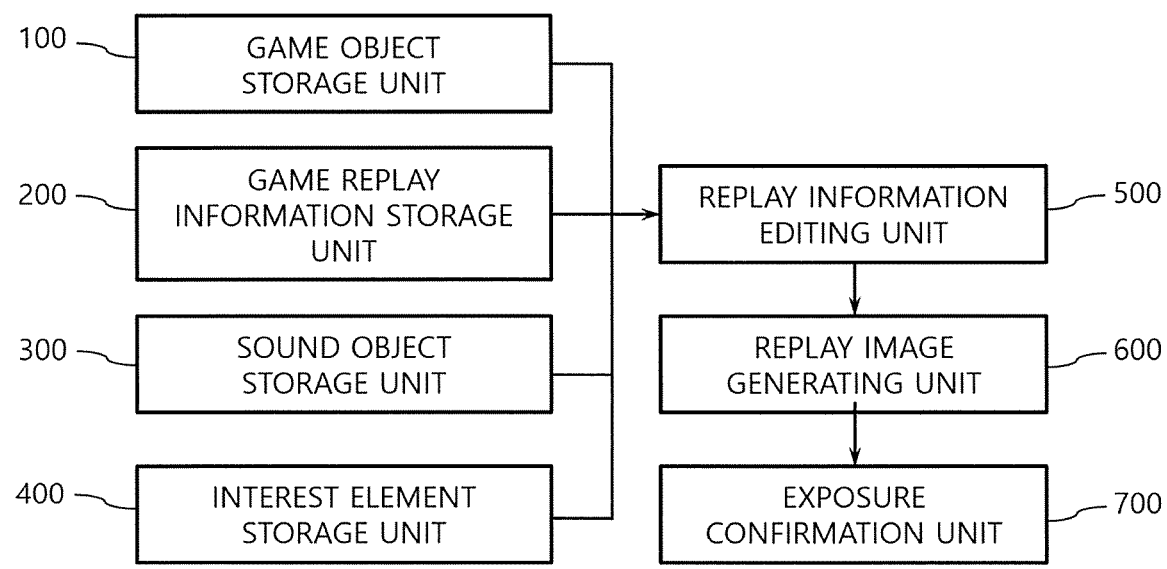

SYSTEM FOR GENERATING GAME REPLAY VIDEO

CROSS-REFERENCE TO RELATED APPLICATION

This application claims the benefit of Korean Patent Application No. 10-2017-0081911, filed on Jun. 28, 2018, in the Korean Intellectual Property Office, the disclosure of which is incorporated herein in its entirety by reference.

BACKGROUND

1. Field

One or more embodiments relate to a system for generating a game replay video, and more particularly, to a system for generating a game replay video, providing a game replay video by recording a game play situation in the form of a virtual reality (VR) video or a 360-degree video to be viewed on a replay terminal.

2. Description of the Related Art

With the increase in the number of game users, more users view game play videos via the Internet or broadcasting.

Game play videos may be replayed and viewed in various manners. A game player may record his or her game play situation and view the recorded video on his or her terminal, or may upload the recorded video to a server such as YouTube for others to view. In addition, a game play situation may be relayed in real time via cable broadcasting or Internet broadcasting.

Recently, such game replays have been frequently provided as a virtual reality (VR) video or a 360-degree video. Moreover, for games that operate in a VR environment, a game play situation of the games may be recorded and provided as a VR or 360-degree replay video.

Videos in a VR format as described above are operated such that a user faces a predetermined direction by manipulating a replay terminal and a scene in that direction is displayed on a display of a replay terminal. Although VR or 360-degree videos allow users to select a direction and view scenes in that direction according to user's manipulation, frequently, important scenes of a game or scenes that need to be exposed to a user according to a service provider's need cannot be viewed by users. It is generally known that viewers viewing a VR video or a 360-degree video spend most of their viewing time by looking forward in a range of 90 degrees or less.

At the start of watching a VR video, a user may not figure out which direction to take and miss an important scene or lose interest in the VR video.

Thus, there is the need for a system for providing a VR video that includes an element inducing a direction desirable for a user to face by manipulating a replay terminal.

SUMMARY

One or more embodiments include a system for generating a game replay video, for assisting users in viewing a virtual reality (VR) video by including an element in a recorded game video to induce a user to view the VR video.

Additional aspects will be set forth in part in the description which follows and, in part, will be apparent from the description, or may be learned by practice of the presented embodiments.

According to one or more embodiments, a system for generating a game replay video includes: a game object storage unit storing, as game object information, shape data corresponding to respective identification numbers of game objects to appear in a game replay video; a game replay information storage unit storing, as game replay information, motion data of the game objects in virtual space according to passage of time during game playing; a sound object storage unit storing sound objects that are added to the game replay video and generate a sound in the form of spatial audio having perspective and directivity at a designated position in virtual space; a game replay information editing unit configured to edit the game replay information stored in the game replay information storage unit to add information for arranging the sound objects stored in the sound object storage unit, in the virtual space; and a replay video generating unit configured to generate the game replay video in the form of one of a VR video and a 360-degree video in real time in conjunction with the game replay information edited by using the game replay information editing unit, the game object information stored in the game object storage unit, and the sound objects stored in the sound object storage unit and to display the game replay video on a display of a replay terminal.

BRIEF DESCRIPTION OF THE DRAWINGS

These and/or other aspects will become apparent and more readily appreciated from the following description of the embodiments, taken in conjunction with the accompanying drawing in which:

FIG. 1 is a block diagram illustrating a system for generating a game replay video according to an embodiment of the present disclosure.

DETAILED DESCRIPTION

Hereinafter, a system for generating a game replay video according to an embodiment of the present disclosure will be described in detail with reference to the attached drawings.

FIG. 1 is a block diagram illustrating a system for generating a game replay video according to an embodiment of the present disclosure.

Referring to FIG. 1, the system for generating a game replay video according to the present embodiment includes a game object storage unit 100, a game replay information storage unit 200, a sound object storage unit 300, and an interest element storage unit 400.

According to the present disclosure, when replaying a game replay video by using a virtual reality (VR) device, a sound object such as spatial audio is included in the game replay video to induce a user to view the game replay video by facing a predetermined point or direction in virtual space.

The present disclosure is used to record and replay a game play situation of games developed using a game development tool such as Unity3D or Unreal whereby games are developed by defining motion of objects such as things, characters, or backgrounds, appearing in a virtual space. The present disclosure is directed to inducing users who view a game replay video acquired by recording a game play situation as a method of collecting game data, to face a predetermined object in virtual space when the user views the game replay video by using, for example, a VR display or a 360 VR display such as a head mounted display (HMD), a mobile device or a display of a personal computer.

Game object information is stored in the game object storage unit 100. Game object information refers to shape data corresponding to respective identification numbers of game objects to appear in a game replay video. Characters, items, weapons, props or the like in each game correspond to game objects. Games as described above may be developed to be played on a 360 VR terminal, or may be games played on a terminal such as a personal computer or a mobile device. The present disclosure is to be applied to a video of a game developed based on an object to be played, wherein the video is recorded and added with a sound object to be replayed on a replay terminal.

The game replay information storage unit 200 stores game replay information. Game replay information includes motion data of game objects in virtual space during a game play according to passage of time. The game replay information as described above is numerical data of motion of game objects in virtual space appearing in a game according to passage of time while a user plays a game by using a game terminal. In general, game replay information is collected by recording numerical data such as coordinates and directions of game objects in three-dimensional space in real time by activating a recording function installed on a game terminal while a game player plays a game. By rendering the game replay information in conjunction with the game object information described above, a game play situation of the game player may be reproduced.

Unlike a method of generating a video file by collecting image frames according to passage of time and connecting the image frames as in the related art, according to the above-described method, a size of recording data may be remarkably reduced, and a game play situation may be replayed at various image qualities. By adjusting a position and direction of a virtual camera used to generate a replay video in a virtual space of a game, a game play situation may be replayed from various points of time different from a point of view of the game player.

According to the system for generating a game replay video of the present embodiment, game replay information may include not only information about movements of game objects according to passage of time but also motion data of a virtual camera that records a game play situation, according to passage of time. The motion data of the virtual camera according to passage of time is basically motion defined by a point of view and a gaze of a game player, but may be edited or modified to a different position or in a different direction or path from the point of view of the game player according to necessity. Motion data of the virtual camera included in the game replay information may include only coordinates of the virtual camera or even a direction of the virtual camera. When replaying a game play situation based on the game replay information, motion data of the virtual camera included in the game replay information may be used only partially or may not be used according to circumstances.

Due to characteristics of a replay terminal replaying a VR video or a 360-degree video, just when a position and a path of a virtual camera are defined, a user may check a game play situation to operate the replay terminal in a predetermined direction from a position of the virtual camera on a replay video. Thus, information about a direction of the virtual camera is not essential for game replay information. A user may choose a predetermined direction at a default position of the virtual camera by operating the replay terminal and view the game play situation. According to circumstances, the user may also view a game replay video by adjusting not only a direction but also a position of the virtual camera by controlling the replay terminal.

The sound object storage unit 300 stores sound objects. According to the present embodiment, a sound object is configured in the form of spatial audio. Spatial audio may be, for example, sound effects, advertisement, music, original sound track (OST) or the like that have perspective and a direction at a designated position in virtual space. When a user is viewing a game replay video including a sound object, by using a replay terminal, and a user's position in virtual space approaches the sound object, the volume may be increased, and when the user's position in virtual space moves away from the sound object, the volume may be decreased. In addition, when a stereo headset or a stereo speaker is installed on a replay terminal, sound from a direction relatively close to the sound object may be set to be heard louder, thereby imparting directivity to the sound object in the virtual space. The sound object performs a function of drawing user's attention when the user is watching a game replay video by using a replay terminal. That is, when the user views a game replay video in the form of a VR or 360-degree video, the user may view the game replay video by facing a predetermined direction, and the sound object located at an appropriate position attracts the user's attention to thereby perform a function of inducing the user to view the game replay video by facing the predetermined direction.

The interest element storage unit 400 stores information of interest element objects as interest element object information. An interest element object refers to an object that is visually displayed at a designated position in virtual space to draw a viewer's attention. An interest element object is configured to be added to a game replay video to attract attention of a viewer watching the game replay video. Examples of the interest element object include various forms of visually displayed objects such as an advertising board, a juke box, a toy, and a game item.

The sound object and the interest element object as described above perform a function of attracting a user's gaze as a point of interest (POI). A sound object functions as an auditory POI, and an interest element object functions as a visual POI.

The game replay information editing unit 500 edits game replay information stored in the game replay information storage unit 200 to generate game replay information in which sound objects and interest element objects are respectively added in virtual space of a game. Here, the game replay information editing unit 500 edits the game replay information such that interest element objects are arranged adjacent to sound objects (preferably, at identical positions as the sound objects).

The game replay information editing unit 500 may edit game replay information such that each sound object and each interest element object are arranged at predetermined positions of virtual space or according to a predetermined rule. The game replay information editing unit 500 may preferably receive preset position data to edit game replay information such that sound objects and interest element objects are arranged at positions in virtual space respectively corresponding to identification numbers of the sound objects and the interest element objects.

According to circumstances, the game replay information editing unit 500 may edit game replay information such that sound objects and interest element objects are arranged along a path that induces a movement and a direction of a virtual camera in virtual space, wherein the movement and direction are to be faced, by using the replay terminal, by a user who is going to view a game replay video by using a replay terminal.

The replay video generating unit 600 generates a game replay video in the form of a VR or 360-degree video in real time by using the game replay information generated by using the game replay information editing unit 500 and displays the game replay video on a display of the replay terminal. The replay video generating unit 600 generates a game replay video in real time in conjunction with game object information stored in the game object storage unit 100, sound objects stored in the sound object storage unit 300, and interest element objects stored in the interest element storage unit 400.

The replay video generating unit 600 may replay a game replay video by generating a 360 VR-type game replay video that is displayable on a spherical screen and displaying a portion of the game replay video corresponding to a field of view of a direction displayed by the replay terminal, on a display of the replay terminal, or may replay a game replay video by generating in real time image frames corresponding to a portion corresponding to a direction that the replay terminal faces (a direction that a virtual camera faces in virtual space) and sequentially displaying the image frames on the display of the replay terminal. When the replay terminal is configured to manipulate not only a direction of the virtual camera in virtual space but also a position of the virtual camera, the replay video generating unit 600 may generate a game replay video in real time according to a point of view and a field of view of the virtual camera based on a position and direction of the virtual camera determined by the replay terminal, and display the game replay video on the display of the replay terminal.

When a sound object appears while a user is viewing a game replay video by using a replay terminal, it is highly likely that the user operates the replay terminal to instinctively turn towards a position of the sound object. As the sound object has perspective and directivity as described above, the user eventually operates the replay terminal towards a position and a direction where the sound object is heard better. The sound object may be sound effects, advertisements, music, OST or the like as described above, and thus, the sound object itself may be a sound advertisement or may be used to guide a user towards an interest element object. When a sound object is a sound advertisement or music, and a user moves to a position in virtual space adjacent to the sound object, the user may listen to the sound advertisement or continue listening to the music. An advertiser or an advertisement seller may determine effects of advertising by determining whether a position of the user in the virtual space is within a reference distance with respect to the sound object or determining a period that the user has stayed within the reference distance. In addition, by placing a sound object at a point where an important event of a game occurs, the user may be easily induced to view important scenes of a game replay video.

In addition, the user may be aurally guided by placing a visually operating interest element object at a location adjacent or identical to a sound object, and then a visual object such as a predetermined video or image may be visually exposed to the user. As described above, an interest element object may be an advertising board, a game item, or a game object itself which may be operated by the user by using a replay terminal. The user will turn towards a position of the sound object or approach that position according to the auditory stimulus provided by the sound object, and is likely to be interested in an interest element object that is placed at the position and visually exposed. When the interest element object is an advertisement, and a user is interested in the advertisement, the user may face the advertisement for a predetermined period of time or longer to observe the advertisement. In this case, the interest element object as the advertisement stays within a field of view of a virtual camera for a predetermined period of time or longer. When the interest element object is a game item, the user may acquire the game item and use the same in a next game play. The interest element object may also be an operable object that may be manipulated. For example, an interest element object in the form of a juke box from which a user may select and listen to a piece of music by inputting a command via operation of the replay terminal may be used.

As described above, according to the system for generating a game replay video of the present embodiment, by using a sound object and an interest element object, a user may be induced to manipulate a replay terminal and turn to a direction in a game replay video, desirable for a service provider when the user is viewing a game replay video provided as a VR video or 360-degree video.

The exposure confirmation unit 700 determines whether a sound object and an interest element object added by the game replay information editing unit 500 are actually exposed to the user by a replay terminal. The exposure confirmation unit 700 determines whether a sound object is exposed to the user by determining whether a point of view of a virtual camera extracting a game replay video has stayed within a reference distance with respect to the sound object for a reference period of time or longer. When the virtual camera and the sound object have stayed within a preset reference distance for a reference period of time or longer, it may be determined that a sound of the sound object has been aurally exposed to the user. The reference distance and the reference period of time may be set in various manners according to setting of a service provider.

The exposure confirmation unit 700 may also determine whether an interest element object is visually exposed to a user in a similar manner as with respect to a sound object.

The exposure confirmation unit 700 determines whether an interest element object is exposed to a user based on whether a point of view of a virtual camera extracting a game play video is located within a reference distance with respect to the interest element object or a sound object corresponding to the interest element object and whether the interest element object is located within a field of view of the virtual camera. In addition to the above criteria, the exposure confirmation unit 700 may also determine whether the interest element object is visually exposed to the user by further reflecting whether the interest element object has stayed within the field of view of the virtual camera for a reference period or longer.

The exposure confirmation unit 700 may determine that an interest element object is exposed to the user only when a distance between a position of the virtual camera and the interest element object is within a reference range. In this case, cases where the interest element object is too close to or too far from the virtual camera and is thus not exposed to the user to an effective extent may be excluded.

As described above, whether an audio-visual object is exposed to the user may be determined by using the exposure confirmation unit 700 by using a sound object and an interest element object, and data about exposure of an audio-visual object to users may be accumulated to be effectively used to apply an advertisement to a game replay video. When a service provider adds an advertisement to game replay information in the form of a sound object or an interest element object, a frequency that the advertisement is substantially exposed to the user may be determined as a reasonable basis for selling the advertisement or charging advertising costs.

While the present disclosure has been described with reference to preferred embodiments, the scope of the present disclosure is not limited to the above described and illustrated structures.

For example, while the system for generating a game replay video having a structure including the exposure confirmation unit 700 is described above, a system for generating a game replay video without the exposure confirmation unit 700 may also be configured. In this case, the present disclosure may be used not to determine whether a sound object or an interest element object is exposed, but to induce a user to operate a replay terminal to face a predetermined direction by turning towards the sound object or the interest element object.

In addition, while the embodiment in which both a sound object and an interest element object are used has been described above, according to circumstances, a system for generating a game replay video in which an interest element object is not used may also be configured. In the case of the system for generating a game replay video according to this embodiment, an interest element storage unit is not included, and also, a replay information editing unit does not reflect an interest element object in game replay information.

Moreover, the above-described methods may be combined in various manners to be used as a method of determining whether a sound object or an interest element object is exposed to a user, performed by an exposure confirmation unit, or another method different from those described above may also be used to determine whether a sound object or an interest element object is exposed to a user.

According to the system for generating a game replay video of the present disclosure, a VR video in a form of inducing a user to easily view important scenes of a game video may be provided to the user, thereby increasing the users' motive for and interest in viewing the VR video.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A system for generating a game replay video, comprising:
   a game object storage unit storing, as game object information, shape data corresponding to respective identification numbers of game objects to appear in a game replay video;
   a game replay information storage unit storing, as game replay information, motion data of the game objects in virtual space according to passage of time during game playing;
   a sound object storage unit storing sound objects that are added to the game replay video and generate a sound in the form of spatial audio having perspective and directivity at a designated position in virtual space;
   a game replay information editing unit configured to edit the game replay information stored in the game replay information storage unit to add information for arranging the sound objects stored in the sound object storage unit, in the virtual space; and
   a replay video generating unit configured to generate the game replay video in the form of one of a VR video and a 360-degree video in real time in conjunction with the game replay information edited by using the game replay information editing unit, the game object information stored in the game object storage unit, and the sound objects stored in the sound object storage unit and to display the game replay video on a display of a replay terminal, wherein the game replay information editing unit edits the game replay information such that the sound object is arranged in the virtual space along a path for inducing a movement and direction of a virtual camera in the virtual space by which the game replay video is to be generated.

2. A system for generating a game replay video, comprising:
   a game object storage unit storing, as game object information, shape data corresponding to respective identification numbers of game objects to appear in a game replay video;
   a game replay information storage unit storing, as game replay information, motion data of the game objects in virtual space according to passage of e during game playing;
   a sound object storage unit storing sound objects that are added to the game replay video and generate a sound in the form of spatial audio having perspective and directivity at a designated position in virtual space;
   a game replay information editing unit configured to edit the game replay information stored in the game replay information storage unit to add information for arranging the sound objects stored in the sound object storage unit, in the virtual space;
   a replay video generating unit configured to generate the game replay video in the form of one of a VR video and a 360-degree video in real time in conjunction with the game replay information edited by using the game replay information editing unit, the game object information stored in the game object storage unit, and the sound objects stored in the sound object storage unit and to display the game replay video on a display of a replay terminal; and
   an interest element storage unit storing, as interest element object information, information of an interest element object added to the game replay video and visually displayed at a designated position in the virtual space to induce a viewer's interest,
   wherein the game replay information editing unit edits the game replay information such that the interest element object stored in the interest element storage unit is arranged at positions adjacent to the sound objects,
   wherein the replay video generating unit generates the game replay video additionally in conjunction with the interest element object information stored in the interest element storage unit and displays the game replay video on the display of the replay terminal.

3. The system for generating a game replay video of claim 1, further comprising an interest element storage unit storing, as interest element object information, information of an interest element object added to the game replay video and visually displayed at a designated position in virtual space to induce a viewer's interest,
   wherein the game replay information editing unit edits the game replay information such that the interest element object stored in the interest element storage unit is arranged at a position adjacent to the sound objects,
wherein the replay video generating unit generates the game replay video additionally in conjunction with the interest element object information stored in the interest element storage unit and displays the game replay video on the display of the replay terminal.

4. A system for generating a game replay video, comprising:
   a game object storage unit storing, as game object information, shape data corresponding to respective identification numbers of game objects to appear in a game replay video;
   a game replay information storage unit storing, as game replay information, motion data of the game objects in virtual space according to passage of time during game playing;
   a sound object storage unit storing sound objects that are added to the game replay video and generate a sound in the form of spatial audio having perspective and directivity at a designated position in virtual space;
   a game replay information editing unit configured to edit the game replay information stored in the game replay information storage unit to add information for arranging the sound objects stored in the sound object storage unit, in the virtual space;
   a replay video generating unit configured to generate the game replay video in the form of one of a VR video and a 360-degree video in real time in conjunction with the game replay information edited by using the game replay information editing unit, the game object information stored in the game object storage unit, and the sound objects stored in the sound object storage unit and to display the game replay video on a display of a replay terminal; and
   an exposure confirmation unit configured to determine whether the sound objects are exposed to a user based on whether a point of view of the virtual camera extracting the game replay video displayed on the display of the replay terminal is located within a reference distance with respect to the sound object.

5. The system for generating a game replay video of claim 1, further comprising an exposure confirmation unit configured to determine whether the sound objects are exposed to a user based on whether a point of view of the virtual camera extracting the game replay video displayed on the display of the replay terminal is located within a reference distance with respect to the sound object.

6. The system for generating a game replay video of claim 4, wherein when the point of view of the virtual camera stays for a reference period of time or longer within the reference distance with respect to the sound object, the exposure confirmation unit determines that the sound object is exposed to the user.

7. The system for generating a game replay video of claim 2, further comprising an exposure confirmation unit configured to determine whether the interest element object is exposed to a user based on whether a point of view of a virtual camera extracting the game replay video displayed on the display of the replay terminal is located within a reference distance with respect to the sound objects and whether the interest element object is located in a field of view of the virtual camera.

8. The system for generating a game replay video of claim 7, wherein when the interest element object stays in the field of view of the virtual camera for a reference period of time or longer, the exposure confirmation unit determines that the interest element object is exposed to the user.

9. A system for generating a game replay video, comprising:
   a game object storage unit storing, as game object information, shape data corresponding to respective identification numbers of game objects to appear in a game replay video;
   a game replay information storage unit storing, as game replay information, motion data of the game objects in virtual space according to passage of time during game playing;
   a sound object storage unit storing sound objects that are added to the game replay video and generate a sound in the form of spatial audio having perspective and directivity at a designated position in virtual space;
   a game replay information editing unit configured to edit the game replay information stored in the game replay information storage unit to add information for arranging the sound objects stored in the sound object storage unit, in the virtual space; and
   a replay video generating unit configured to generate the game replay video in the form of one of a VR video and a 360-degree video in real time in conjunction with the game replay information edited by using the game replay information editing unit, the game object information stored in the game object storage unit, and the sound objects stored in the sound object storage unit and to display the game replay video on a display of a replay terminal, wherein the game replay information editing unit edits the game replay information such that the sound objects are arranged along a path for inducing a movement of a virtual camera recording the game replay video displayed on the display of the replay terminal.

10. The system for generating a game replay video of claim 1, wherein the sound objects stored in the sound object storage unit are one of sound effects, advertisement, and music.

\* \* \* \* \*